United States Patent [19]

Kakinoki et al.

[11] Patent Number: 5,766,749

[45] Date of Patent: Jun. 16, 1998

[54] FOAM-EXPANDED MATERIAL

[75] Inventors: Hideo Kakinoki, Hino; Hisaya Sato, Koganei, both of Japan

[73] Assignee: Watanabe-Zo Shoten Co., Ltd., Ichinomiya, Japan

[21] Appl. No.: 540,786

[22] Filed: Oct. 11, 1995

[30] Foreign Application Priority Data

Oct. 12, 1994 [JP] Japan ................................. 6-272995

[51] Int. Cl.⁶ ..................................................... B32B 3/26
[52] U.S. Cl. ............................ 428/304.4; 521/65; 521/69
[58] Field of Search .......................... 428/304.4; 521/65, 521/69

[56] References Cited

U.S. PATENT DOCUMENTS 4,460,711  7/1984  Jacobson ................................. 521/65
4,992,481  2/1991  von Bonin et al. ..................... 521/54
5,115,000  5/1992  Jane et al. .

FOREIGN PATENT DOCUMENTS 0 376 201    7/1990   European Pat. Off. .
WO91/02023   2/1991   WIPO .

*Primary Examiner*—Helen L. Pezzuto
*Attorney, Agent, or Firm*—Kanesaka & Takeuchi

[57] ABSTRACT

A foam-expanded material of the invention has biodegradability, and is suitable for use as a shock absorber that prevents environmental pollution. When the foam-expanded material is formed, a granular material is prepared by mixing starch, rubber latex and water. The granular material is packed in a mold and heated to thereby form the foam-expanded material.

7 Claims, No Drawings

FOAM-EXPANDED MATERIAL

BACKGROUND OF THE INVENTION

1. Field of the Invention

This invention relates to a foam-expanded material. In particular, it relates to a foam-expanded material having biodegradability.

2. Description of the Related Art

Packing crates have conventionally been used to pack and transport various kinds of precision instruments. The precision instrument is packed in a crate, and a shock-absorbing material formed from an expanded styrol resin is packed between the instrument and crate. This shock-absorbing material absorbs external shocks when the crate is transported, and protects the instrument in the crate from the shocks.

A shock-absorbing material formed from expanded styrol resin which is packed between the instrument and the crate when the crate is transported, essentially maintains its original form over a long period of time without decomposing in the environment even when it is thrown away. Further, when the shock-absorbing material made from this expanded styrol resin is burnt, it may emit black smoke and damage the heating furnace when it reaches a high temperature and melts. Shock-absorbing material made from this expanded styrol resin therefore lead to environmental pollution.

It is known that when starch containing water is heated and thereafter cooled under high temperature and pressure, it expands so as to form a lightweight material. This expanded material formed from starch has a high biodegradability, and dissolves within several minutes when thrown into water. Moreover it has a high degree of hardness, however since it has a low resilience, it is brittle. It is consequently difficult to use as a foam-expanded material and in particular as a shock absorber.

In order to overcome these disadvantages, various research have been reported wherein synthetic polymers have been blended with the starch. For example, it has been proposed that a foam-expanded material can be obtained after adding polyethylene or its copolymers to starch. However, when polyethylene or its copolymers are added, the biodegradability of the starch itself declines or disappears. A method has been reported wherein a polylactate or ethylene/vinyl alcohol copolymer is added to starch instead of polyethylene. However although in this case the biodegradability of the starch is not lost, it is too costly and therefore uneconomical or impractical to use this product as a shock absorber in packing.

The inventors found that if a mixture of starch with natural rubber was used, the biodegradability of the starch was not lost, the resulting foam-expanded material had suitable strength and resilience and due to its low cost, it was extremely useful as a substitute for polystyrene in shock-absorbing materials.

OBJECT AND SUMMARY OF THE INVENTION

This invention, which is based on the above discovery, aims to provide a foam-expanded material that is biodegradable and in particular can be used as a shock absorber.

When starch is heated to a high temperature in the presence of water, it converts to the a form and changes to a substance of high viscosity. When rubber latex is blended with the a starch in a proportion of 3–60 weight % in this heating step, a homogeneous mixture is obtained as the two substances have a strong molecular affinity. When this mixture is cooled, and the product in granular or powder form is expanded in a mold at high temperature and high pressure, it foams and expands to 5–40 times its original volume. The product obtained after cooling is a lightweight foam-expanded material having adequate strength and resilience. It was verified that this foam-expanded material was extremely useful as packing or as a shock absorber.

The foam-expanded material according to this invention is formed by expanding a mixture of starch, rubber latex and water to a predetermined shape with heating. Herein, it is preferred that the proportion of rubber latex relative to starch is 3–60 weight %.

The raw material used for manufacturing this foam-expanded material is thus a mixture of starch, rubber latex and water in the form of granules or powder.

If 0.1–5 weight % of an organic peroxide, for example benzoyl peroxide, is added to the aforesaid rubber latex, the strength and resilience of the foam-expanded product is further increased due to cross-linking of the rubber, and a foam-expanded material having physical properties which are superior to those of foam-expanded styrol resin is obtained.

The starch mixture used to manufacture the aforesaid foam-expanded material contains 10–25 weight % of water. Mould therefore grows easily on it, and it is consequently desirable to add a small quantity of a fungicide such as sorbic acid or butylparaoxybenzoic acid. It was confirmed that the addition of this small amount of fungicide has practically no effect on the physical properties of the foam-expanded product.

The foam-expanded material formed from the mixture of starch and rubber latex has a slightly brown tinge. If this original color of the product is undesirable, dyes may be added to change it. Alternatively, when it is desired to obtain a white, lightweight foam-expanded material without any coloration, it is preferable to remove the protein contained in the raw rubber latex. A major proportion of this protein can be removed from the latex by centrifugation. When the foam-expanded material is manufactured from a mixture of starch with raw rubber latex from which the protein has been eliminated, a pure white product is obtained.

Further, it was confirmed that when 0.5–3 weight % of powdered eggshell or calcium carbonate is added to the starch in the manufacture of the foam-expanded material, although the degree of expansion of the material increases and its specific gravity decreases by 5% or more, there is no difference as regards strength and resilience.

Next, the method of manufacturing this foam-expanded material will be described. Powdered starch is introduced in an extruder, then water and raw rubber latex are added. The amount of water is adjusted so that it represents 10–25 weight % of the mixture. The mixture is heated in the extruder to 100° C. or higher, and blended as the starch converts to the α form so as to give a homogeneous, viscous mixture. This mixture is extruded from the extruder in the form of a rod, cut into pellets or shaped into granules, or if necessary crushed to a powder. Further, if necessary, a fungicide or a synthetic polymer emulsion may be added to the raw rubber latex together with water.

In the heating and blending process in the extruder, the starch is converted to the α form and granules containing 10–30 weight % of water are obtained.

When these granules are introduced in a mold and heated to a temperature within the range 100°–250° C. or more preferably 150°–200° C., this granular material foams within a few seconds and expands to fill the shape of the cavity of the mold. In this way, a lightweight foam-expanded material is obtained. In the expansion process, the material expands to 3–40 times its original volume. The strength and resilience of the foam-expanded material obtained are not inferior to those of expanded polystyrene.

Hence, in the method of manufacturing the foam-expanded material according to this invention, starch, rubber latex and water are blended together, the starch is converted to the α form prior to or at the same time as the blending, the mixture of starch, rubber latex and water is formed into granules or powder, the granular or powdered mixture thus obtained is filled in a mold, and the mixture is expanded to a predetermined shape with heating so as to give the foam-expanded material. In this process, it is required to heat the mold to within the range 100°–250° C.

Addition of synthetic polymers to the raw rubber is effective in improving the resilience of the foam-expanded material but leads to an impairment of biodegradability, the deterioration of biodegradability being particularly marked with polyethylene and polyvinyl chloride. If a synthetic polymer is added to the raw rubber, therefore, it is desirable to add no more than 20 weight % and if possible no more than 5 weight % relative to the weight of raw rubber.

In this foam-expansion method, the granules may be formed also by a granulator, i.e. the granulator forms beads which are then foam-expanded in a molding machine. In this case, 10 weight parts of water and 5–100 weight parts of raw rubber latex (pure component is not more than 60 weight %) are added to 110 weight parts of a mixture of starch and α starch in a proportion of 1:0.1–1.5, thoroughly kneaded, and introduced with a small amount at a time into a rotary granulator at 50°–100° C. so as to obtain spherical bodies with the diameter in the range 0.5–20 mm.

The spherical bodies obtained from the rotary granulator are then introduced into a mold, and heated to 150°–250° C. for several seconds. The product which is removed is a lightweight, foam-expanded material in the shape of the cavity of the mold. This foam expanded material was found to have physical properties which are not inferior to those of expanded polystyrene as a shock absorber.

Polyvinyl alcohol may be used instead of rubber latex in order to confer resilience on the foam-expanded material for which starch is the principal raw material. In other words, the addition of polyvinyl alcohol or its derivatives which have a plasticizing effect on starch effectively makes the foam-expanded material more resilient. If on the other hand it is desired to have greater strength, natural rubber latex may be added.

To improve the water solubility of polyvinyl alcohol added to the starch, the polyvinyl alcohol contains 5–50 weight % and preferably 10–30 weight % of non-saponified vinyl acetate. If 5–30 weight % of this polyvinyl alcohol is added to starch, the resulting mixture becomes more plastic, and if 5–20 weight % of urea is added, the resilience of the foam-expanded material is further increased.

When the mixture of starch and polyvinyl alcohol is made into granules or powder, for example when it is formed into pellets, the strength of the resulting foam-expanded material remarkably increases if 3–20 weight % of natural rubber latex is added, and if urea is added which acts as a dispersant, even better results are obtained.

It was found that when pellets containing starch with natural rubber latex, polyvinyl alcohol and urea were heated to approximately 200° C., a foam-expanded material having superlative strength and great resilience was obtained.

The product according to this invention has effectively the same degree of strength and resilience as conventional expanded polystyrene, and a biodegradable foam expanded material can be obtained. This foam-expanded material is suitable for use as a shock absorber or packing material, and in particular when it is used as a shock absorber, environmental pollution arising when shock absorbers are used to protect precision instruments from shocks and then thrown away, can be prevented.

EXAMPLES

Example 1

100 parts by weight of starch powder were introduced in an extruder, approximately 10 parts by weight of water and 20 parts by weight of 60 weight % pure natural rubber latex were added, and the mixture blended with heating to 130°–140° C. When the mixture was extruded from the orifice of the extruder, a substance resembling soft noodles was obtained. This was cut by a cutter while cooling so as to obtain small circular pellets which were light brown in color.

As these pellets contained 10–25% weight % of water, moulds easily grow on them and it is therefore desirable to add approximately 0.01–0.1 weight % of a fungicide.

The pellets thus obtained were expanded under pressure for several seconds in a press molding machine at 150°–200° C. so that their volume increased by 10–30 times. When the product was cooled, a hard foam-expanded material was obtained.

When the raw material is starch alone, it expands in the same way, but as the expanded material obtained has low resilience and is brittle, it easily fractures when it is subjected to shocks. In contrast, the foam-expanded material obtained according to the method of this example had essentially the same resilience as that of foam-expanded material made from commercial polystyrene.

Example 2

To 100 parts by weight of powdered starch, 2 parts by weight of powdered eggshell were added. When the mixture was introduced in an extruder, 15 weight % of water and 15 weight % (purity 60 weight %) of raw rubber latex were added, the product was blended at 100°–150° C., extruded and cut, and light brown circular pellets were obtained.

To obtain small granules close to a powder, the pelletized product was placed in an ordinary crusher with cooling so as to give very fine granules or a powdery substance.

The circular pellet, very fine granule or powder was introduced in a heat molding machine. When this product was subjected to pressure while heating to 150°–200° C. for several seconds, it expanded to 20–40 times in its volume to give a lightweight foam-expanded material having the shape of the cavity of the mold. It was found that the same result was obtained when calcium carbonate was used in place of powdered eggshell.

It was found that when a part of the raw rubber latex was substituted by, for example, 10–30 weight % of polyethylene acryl emulsion, the strength and resilience of the lightweight foam-expanded material were improved, but biodegradability declined to some extent.

Example 3

To 100 parts by weight of a 1:1 blend of starch and α starch, 10 weight % of water was added followed by 20 weight % of 60% pure raw rubber latex. The mixture was heated to 50°–100° C., and formed into small beads by a hemispherical rotary granulator. If it is necessary to store the product for some time, it is preferable to add 0.05 weight % of a fungicide in the final stage.

The mixture containing raw rubber latex has a light brown color, however if latex from which protein has been removed by centrifuging raw rubber latex is used, a pure white product is obtained. Granules having a diameter of approximately 1 mm are easiest to use, however this size may be adjusted freely within the range 0.5–40 mm depending on the size of expanded product.

It was found that if a 50 weight % aqueous dispersion of SBR is used instead of the aforesaid raw rubber latex, pure white granules are obtained, but their biodegradability is poor, and when the resulting foam-expanded material is placed in water, the rubber fraction remains as a permanent residue. It was also found that if a polyethylene emulsion was used instead of SBR, the polyethylene fraction remains as a permanent residue although the starch decomposes in water.

Example 4

To 100 parts by weight of starch, 40 parts by weight of raw rubber latex (containing 60 weight % of pure rubber) and 0.1 parts by weight of butylparaoxybenzoic acid were added, the mixture was blended in an extruder while heating to 100°–140° C., cooled to 70° C., and extruded into a light brown, transparent sheet of 0.3 mm thickness. This sheet was cut in a crusher so as to obtain small pieces of desired size, for example approximately 0.5–1 mm.

When these granules were packed in a mold, supplied to an extrusion molding machine at 150°–250° C., heated for several seconds under airtight conditions and the resulting substance was removed, a lightweight foam-expanded product having the shape of the cavity of the mold was obtained. It was found that the expanded product had 10–30 times in the volume of the raw material.

This foam-expanded material had good biodegradability, however it had poor water resistance and lost its strength when immersed in water for approximately 8 hours.

Example 5

To 100 parts by weight of starch, 12 parts by weight of water and 7 parts by weight of raw rubber latex (containing 60 weight % of pure rubber) were added, and the mixture was supplied to an extruder, blended at 140° C., extruded with cooling and cut so as to obtain pellets having a slight brown coloration. The surfaces of the pellets were sprayed with a 0.5% aqueous solution of sorbic acid, allowed to dry, introduced in a press molding machine, and subjected to pressure for several seconds at 150°–250° C. so as to obtain a foam-expanded product. This foam-expanded product had approximately 30 times in the volume of the raw material.

When butadiene rubber latex was used instead of raw rubber latex, a pure white product was obtained, however although it softened in water, it essentially retained its original shape even after several months.

When 3 parts by weight of polyvinyl chloride was added to the aforesaid raw rubber latex in order to improve the strength and resilience of the expanded material, the expansion was facile and the resilience of the product improved. Although biodegradability was poorer, however, there was no remarkable decrease of the composition rate at this level of addition.

Example 6

To 100 parts by weight of starch, 12 parts by weight of water and 10 parts by weight of polyvinyl alcohol (containing 5–30% of non-saponified acetates) were added, and the mixture was heated to 130° C. The product was extruded with cooling, and cut into pellets.

When the pellets thus obtained were subjected to pressure at a high temperature of 200°–220° C. in a mold, they expanded to approximately 30–40 times in their volume. When this foam-expanded material was cooled, a highly resilient expanded material was obtained that was found to be highly valuable as a shock absorbing cushion.

In comparison with the foam-expanded material formed from starch alone, the product stood for a larger deformation under pressure, but it was less liable to fracture.

It was found that the addition of 10 parts by weight of urea to water during pellet manufacture led to a somewhat larger volume and better resilience on expansion.

Example 7

To 100 parts by weight of starch, 18 parts by weight of water were added followed by 15 parts by weight of polyvinyl alcohol containing 5–30% of non-saponified substances, 5 parts by weight (in terms of pure component) of natural rubber latex and 10 parts of urea, and these components were blended. The resulting mixture was heated to 130° C. in an extruder, extruded while cooling and cut into pellets so as to obtain light brown granules.

When the granules thus obtained were heated to 200°–220 C. in a mold, they expanded by approximately 30–40 times their volume to give a foam-expanded material. It was found that this material had a smooth surface, very high resilience and adequate strength under external pressure.

What is claimed:

1. A foam-expanded material made by foam-expanding a mixture of starch in an α form, natural rubber latex and water to a predetermined shape with heating.

2. A foam-expanded material as defined in claim 1 wherein 3–60 weight % of said rubber latex is mixed with said starch.

3. A foam-expanded material as defined in claim 1, wherein said natural rubber latex is contained in the starch in the α form in a proportion of 3–60 weight %, and the starch contains 10–25 weight % of water.

4. A foam-expanded material made by foam-expanding a mixture of starch in an α form, polyvinyl alcohol, rubber latex and water to a predetermined shape with heating.

5. A foam-expanded material as defined in claim 4 to which urea is added as a dispersant.

6. A foam-expanded material as defined in claim 4, wherein said rubber latex is a natural rubber latex, and said polyvinyl alcohol contains 5–50 weight % of non-saponified vinyl acetate.

7. A foam-expanded material as defined in claim 4, wherein said polyvinyl alcohol is contained between 3 and 20 weight % relative to the natural rubber.

* * * * *